(12) United States Patent
Recur et al.

(10) Patent No.: US 10,354,418 B2
(45) Date of Patent: Jul. 16, 2019

(54) TOMOGRAPHIC RECONSTRUCTION FOR MATERIAL CHARACTERIZATION

(71) Applicant: FEI Company, Hillsboro, OR (US)

(72) Inventors: Benoit Mathieu Baptiste Recur, Bordeaux (FR); Mahsa Paziresh, Acton (AU); Glenn Robert Myers, Waramanga (AU); Andrew Maurice Kingston, Holder (AU); Shane Jamie Latham, Griffith (AU)

(*) Notice: Subject to any disclaimer, the term of this patent is extended or adjusted under 35 U.S.C. 154(b) by 15 days.

(21) Appl. No.: 15/504,302

(22) PCT Filed: Aug. 15, 2015

(86) PCT No.: PCT/US2015/045441
§ 371 (c)(1),
(2) Date: Feb. 15, 2017

(87) PCT Pub. No.: WO2016/028654
PCT Pub. Date: Feb. 25, 2016

(65) Prior Publication Data
US 2018/0082447 A1    Mar. 22, 2018

Related U.S. Application Data

(60) Provisional application No. 62/038,263, filed on Aug. 16, 2014.

(51) Int. Cl.
*G06K 9/00* (2006.01)
*G06T 11/00* (2006.01)
(Continued)

(52) U.S. Cl.
CPC .......... *G06T 11/008* (2013.01); *G06K 9/6218* (2013.01); *G06K 9/6277* (2013.01);
(Continued)

(58) Field of Classification Search
None
See application file for complete search history.

(56) References Cited

U.S. PATENT DOCUMENTS

| 7,693,318 B1 | 4/2010 | Stalling et al. |
| 9,872,662 B2 * | 1/2018 | Raupach ................ A61B 6/032 |

(Continued)

FOREIGN PATENT DOCUMENTS

| JP | 2006084467 A | 3/2006 |
| JP | 2008000190 A | 1/2008 |

(Continued)

OTHER PUBLICATIONS

Mendonça, P. R., Lamb, P., & Sahani, D. V. (2014). A flexible method for multi-material decomposition of dual-energy CT images. IEEE transactions on medical imaging, 33(1), 99-116.*

(Continued)

*Primary Examiner* — Samah A Beg

(57) ABSTRACT

Some embodiments of the invention provide a method of determining a material characteristic of material in a sample by iterative tomographic reconstruction. The method conducts one or more X-ray tomography scans of a sample, and then determines one or more estimated material characteristics, such as atomic number and density, for multiple volume elements in the sample using a tomographic reconstruction algorithm. These estimated material characteristics are then modified by reference to stored known material characteristic data. Preferably, determining the composition of the sample volume during reconstruction includes segmenting the sample into regions of common composition, the segmenting being performed during iterative reconstruction instead of being based on the voxel characteristics determined upon the completion of iterative reconstruction. Preferred versions will perform one or more additional iterations of the tomographic reconstruction algorithm, (Continued)

where each iteration updates the one or more estimated material characteristics for the volume elements.

17 Claims, 11 Drawing Sheets

(51) Int. Cl.
*G06T 7/11* (2017.01)
*G06K 9/62* (2006.01)

(52) U.S. Cl.
CPC .............. *G06T 7/11* (2017.01); *G06T 11/006* (2013.01); *G06T 2207/10081* (2013.01); *G06T 2207/10116* (2013.01); *G06T 2207/30181* (2013.01); *G06T 2211/408* (2013.01); *G06T 2211/424* (2013.01)

(56) References Cited

U.S. PATENT DOCUMENTS

| | | | |
|---|---|---|---|
| 2008/0137803 A1* | 6/2008 | Wu | A61B 6/032 378/5 |
| 2009/0110242 A1* | 4/2009 | Touati | G06K 9/00 382/109 |
| 2009/0208084 A1* | 8/2009 | Liu | A61B 6/032 382/131 |
| 2009/0214095 A1* | 8/2009 | Wu | G06T 5/002 382/131 |
| 2010/0060509 A1* | 3/2010 | Chambers | G01S 7/411 342/22 |
| 2010/0239182 A1 | 9/2010 | Basu | |
| 2011/0116605 A1* | 5/2011 | Radley | G01N 23/087 378/162 |
| 2012/0245873 A1* | 9/2012 | Donnangelo | G01N 22/00 702/65 |
| 2013/0343629 A1* | 12/2013 | Myers | G06T 11/006 382/131 |
| 2014/0205170 A1 | 7/2014 | Cierniak | |
| 2014/0219417 A1 | 8/2014 | Batenburg et al. | |
| 2014/0236488 A1* | 8/2014 | Brown | A61B 6/505 702/19 |
| 2014/0307847 A1* | 10/2014 | Schmidt | A61B 6/032 378/5 |
| 2015/0177395 A1* | 6/2015 | Proksa | A61B 6/4241 702/104 |
| 2015/0303021 A1 | 10/2015 | Parker et al. | |
| 2016/0054453 A1* | 2/2016 | Moriyasu | G01T 1/2985 378/19 |
| 2017/0172533 A1* | 6/2017 | Raupach | A61B 6/032 |
| 2017/0200067 A1* | 7/2017 | Zhou | G06K 9/6297 |
| 2017/0228897 A1* | 8/2017 | Holt | G06T 11/008 |
| 2018/0114314 A1* | 4/2018 | Butler | G06T 7/0012 |

FOREIGN PATENT DOCUMENTS

| | | |
|---|---|---|
| JP | 2009506854 A | 2/2009 |
| JP | 2010223963 A | 10/2010 |
| JP | 2011514822 A | 5/2011 |
| JP | 2011112650 A | 6/2011 |
| JP | 2011519031 A | 6/2011 |
| JP | 2013535678 A | 9/2013 |
| JP | 2014505864 A | 3/2014 |
| WO | 2012083372 A1 | 6/2012 |

OTHER PUBLICATIONS

E. Maire & P. J. Withers (2014) Quantitative X-ray tomography, International Materials Reviews, 59:1, 1-43, DOI: 10.1179/1743280413Y.0000000023.*

Lenoir, N., Bornert, M., Desrues, J., Bésuelle, P., & Viggiani, G. (2007). Volumetric digital image correlation applied to X-ray microtomography images from triaxial compression tests on argillaceous rock. Strain, 43(3), 193-205.*

Limkitjaroenporn, P., Kaewkhao, J., Chewpraditkul, W., & Limsuwan, P. (2012). Mass attenuation coefficient and effective atomic number of Ag/Cu/Zn alloy at different photon energy by Compton scattering technique. Procedia Engineering, 32, 847-854.*

Alvarez, R.E., et al., "Energy-selective reconstructions in X-ray computerized tomography," Physics in Medicine and Biology, Sep. 21, 1976, vol. 21, No. 5, pp. 733-744.

Beister, Marcel, et al., "Iterative reconstruction methods in X-ray CT," Physica Medica 23, Feb. 10, 2012, pp. 94-108.

Erdogan, H. et al., "Ordered subsets algorithms for transmission tomography," Phys. Med. Biol. 44 (1999) pp. 2835-2851.

Fessler, J. et al., "Maximum-likelihood dual-energy tomographic image reconstruction," SPIE Proceedings, vol. 4684, Tomographic Reconstruction I, May 15, 2002, 2 pages.

Heismann, B.J., et al., "Density and atomic number measurements with spectral x-ray attenuation method," Journal of Applied Physics, vol. 94, No. 3, Aug. 1, 2003, 3 pgs.

Holt, Jeremy, et al., "Correction of Beam Hardening Artefacts in Microtomography for Samples Imaged in Containers," Proc. SPIE 9212, Developments in X-Ray Tomography IX, Sep. 11, 2014, 12 pgs.

Iassonov, Pavel, et al., "Segmentation of X-ray computed tomography images of porous materials: A crucial step for characterization and quantitative analysis of pore structures," Water Resources Research, vol. 45, Sep. 24, 2009, 12 pgs.

Johnson, Thorsten R.C., "Material differentiation by dual energy CT: initial experience," Computer Tomography, vol. 17, Dec. 7, 2006, pp. 1510-1517.

Krumm, M. et al., "Reducing non-linear artifacts of multi-material objects in industrial 3d computed tomography," NDT&E International 41 (2008) pp. 242-251.

Long, Yong, et al., "Multi-Material Decomposition Using Statistical Image Reconstruction for Spectral CT," IEEE Transactions on Medical Imaging vol. 33, No. 8, Aug. 2014, pp. 1614-1626.

Myers, Glenn R., et al., "Improving dynamic tomography quality through a maximum of Posteriori estimation," Proc. of SPIE, vol. 9212, 2014, 9 pgs.

Recur, B, et al., "Dual-enemy iterative reconstruction for material characterisation", Proc. SPIE 9212, Developments in X-Ray Tomography IX, 921213, Sep. 11, 2014.

Siddiqui, Shammen, et al., "Dual-Energy CT-Scanning Applications in Rock Characterization," SPE International, Sep. 26-29, 2004, 9 pgs.

Zou, Yu et al., "Analysis of fast kV-switching in dual energy CT using a pre-reconstruction decomposition technique," SPIE Proceedings, vol. 6913, Dual Energy, Feb. 16, 2008, 2 pages.

* cited by examiner

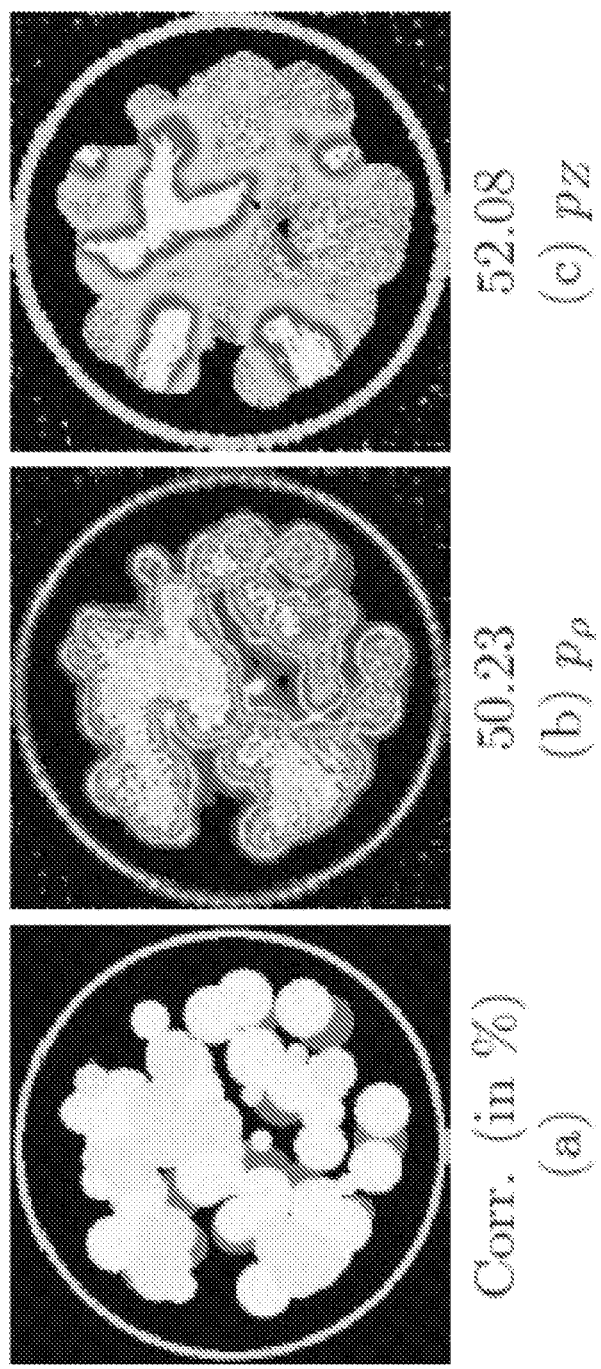
Fig. 4(a)-(c)

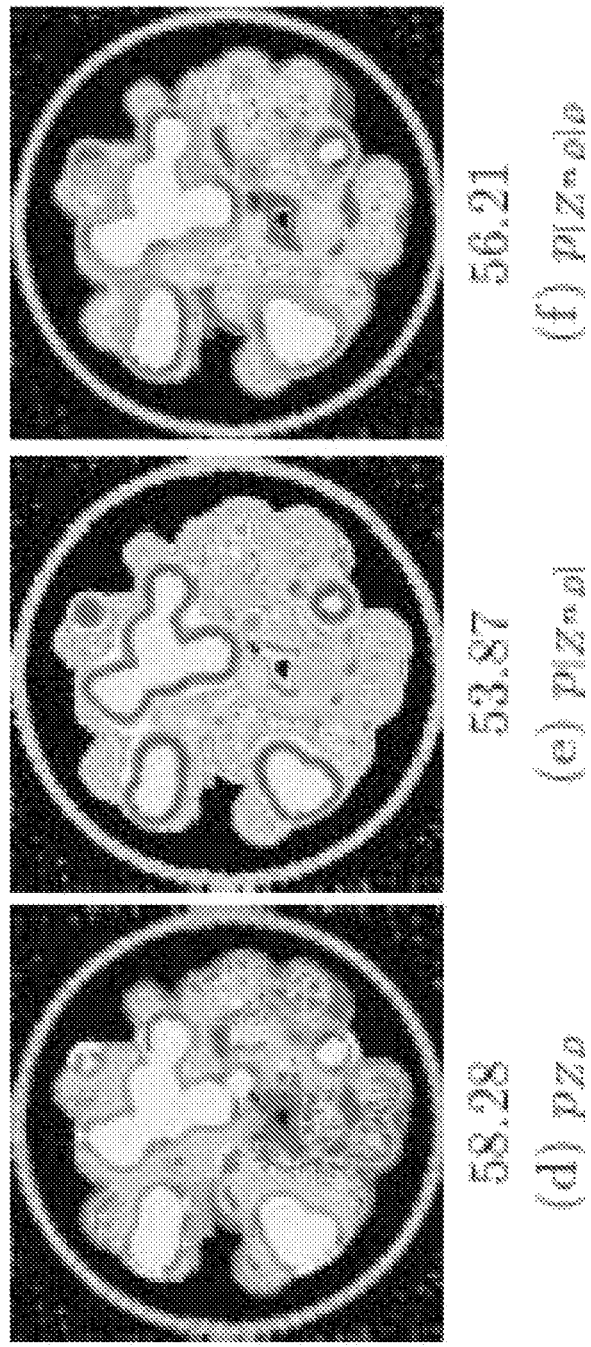
Fig. 4(d)-(f)

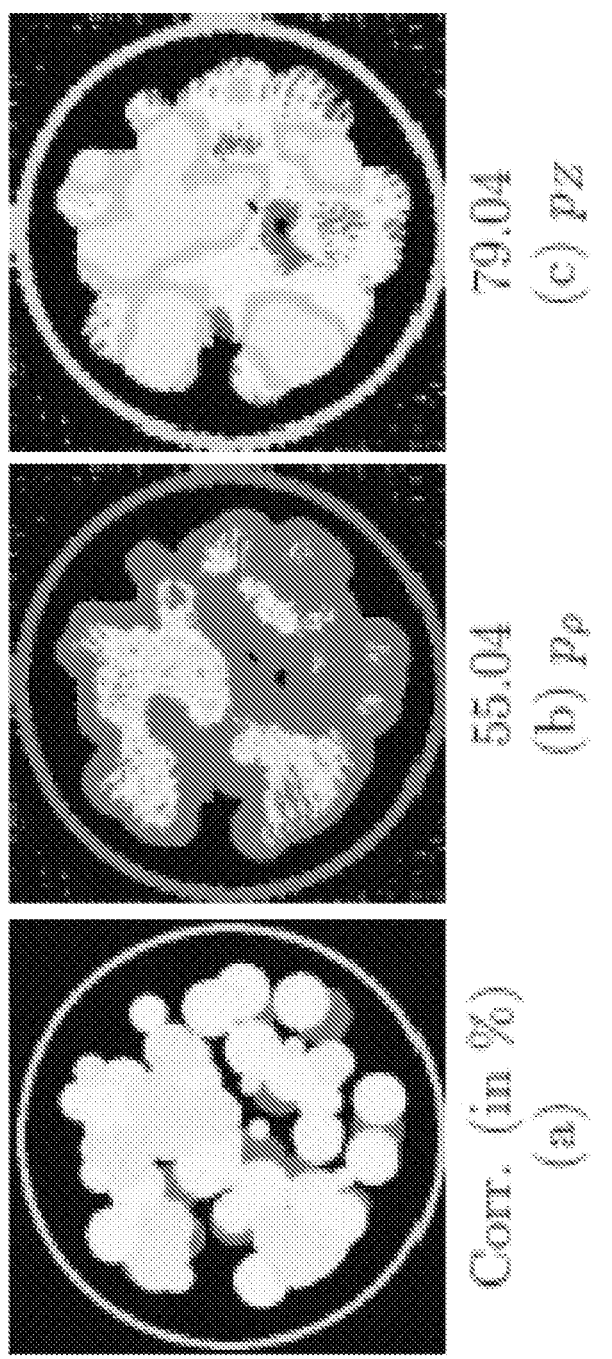
Fig. 5(a)-(c)

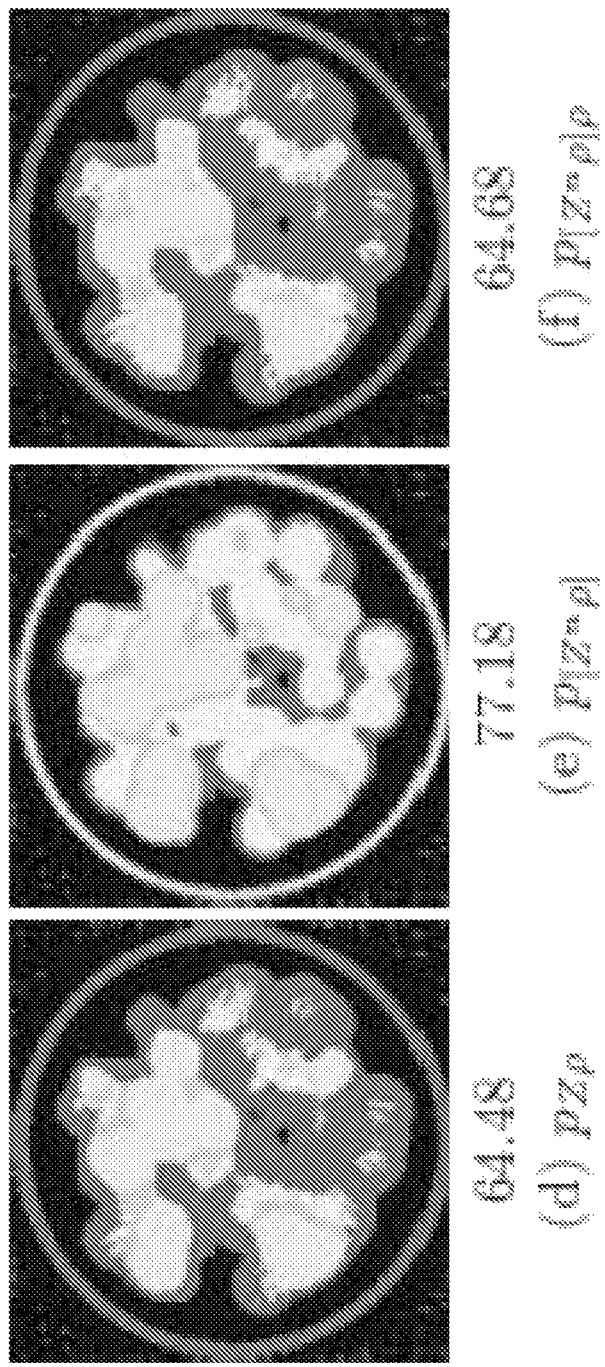
Fig. 5(d)-(f)

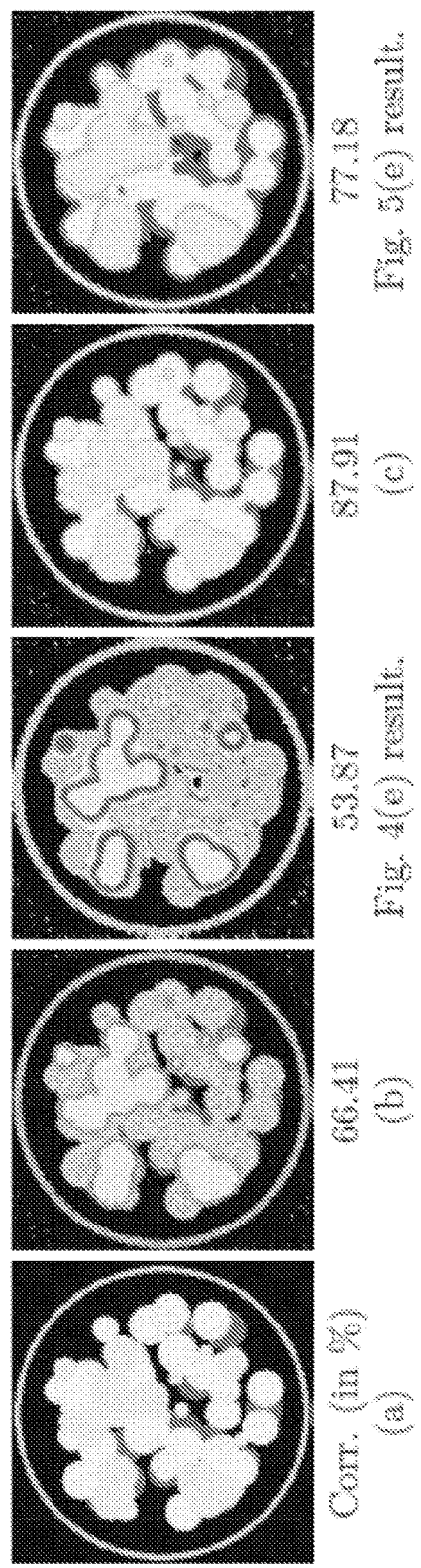
Fig. 6(a)-(c)

| Name | Chemical Formula | $\rho$ (g/cc) | $Z_{eff}$ |
|---|---|---|---|
| Air | Air | 0.001 | 7.2240 |
| Iron Pure | Fe | 5.600 | 26.0000 |
| Rutile | $TiO_2$ | 4.200 | 19.0006 |
| Siderite | $FeCO_3$ | 3.960 | 21.0932 |
| Na-Montmorillonite | $NaAl_5MgSi_{12}O_{30}(OH)_6$ | 2.650 | 11.4620 |
| Water | $H_2O$ | 1.000 | 7.5195 |
| Graphite | C | 2.300 | 6.0000 |
| Calcite | $CaCO_3$ | 2.710 | 15.7100 |
| Dolomite | $CaMg(CO_3)_2$ | 2.870 | 13.7438 |
| Quartz Mineral | $SiO_2$ | 2.650 | 11.5800 |
| Aluminium Pure | Al | 2.700 | 13.0000 |
| Anhydrite | $CaSO_4$ | 2.950 | 15.6847 |
| Fused Quartz | $SiO_2$ | 2.200 | 11.7842 |
| Pyrite | $FeS_2$ | 5.020 | 21.9588 |
| Barite | $BaSO_4$ | 4.500 | 47.2008 |
| Na-Feldspar | $NaAlSi_3O_8$ | 2.610 | 11.5534 |
| K-Feldspar | $KAlSi_3O_8$ | 2.530 | 13.3895 |
| Kaolinite | $Al_2Si_2O_5(OH)_4$ | 2.600 | 11.1622 |
| Illite | $KAl_3Si_3O_{10}(OH)_2$ | 2.800 | 9.6058 |
| Ca-Montmorillonite | $Ca_{0.4}Al_4MgSi_{12}O_{30}(OH)_6$ | 2.650 | 11.8277 |
| Chlorite | $Fe_2Mg_2Al_2Si_3Al_{12}O_{10}(OH)_8$ | 2.900 | 11.6449 |
| Celestite | $SrSO_4$ | 3.960 | 30.4686 |
| Talc | $Mg_3Si_4O_{10}(OH)_2$ | 2.750 | 8.4338 |
| Halite | NaCl | 2.350 | 15.3295 |

TOMOGRAPHIC RECONSTRUCTION FOR MATERIAL CHARACTERIZATION

CROSS-REFERENCE TO RELATED APPLICATIONS

This application claims priority to Provisional Application No. 62/038,263 filed Aug. 16, 2014, and entitled "Tomographic Reconstruction for Material Characterization."

TECHNICAL FIELD OF THE INVENTION

The present invention relates to tomographic reconstruction, and in particular, to the use of tomographic reconstruction to determine material characteristics of a sample.

BACKGROUND OF THE INVENTION

Tomography entails detecting radiation that traverse a slice of a subject at multiple angles and reconstructing properties of the sample from the detected radiation. If the source of radiation is within the subject, the technique is referred to as emission tomography. For example, positron emission tomography (PET) and single photon emission computed tomography (SPECT) are used in medical imaging in which gamma rays emitted from within the patient are detected. If the source of radiation is outside the subject, such as in x-ray computed tomography (CT) the technique is referred to as transmission tomography. CT is used in medical imaging, as well as geological sample, such as fossils, reservoir rocks, and soil.

After the radiation is detected, a reconstruction algorithm is applied to the detector data to build a model of the sample scanned. Analytical techniques, such as filtered back projection, are based on a single reconstruction, whereas iterative techniques use multiple repetitions of an algorithm that converges toward an improved solution.

Iterative techniques include Algebraic Reconstruction Technique (ART), Simultaneous ART, Simultaneous iterative reconstruction technique (SIRT), Ordered subset SIRT, Multiplicative algebraic reconstruction technique, Maximum likelihood expectation-maximization, Ordered subset expectation-maximization, Ordered subset convex algorithm, Iterative coordinate descent (ICD), Ordered subset ICD, or Model-based iterative reconstruction.

X-ray CT has been used to map the internal structure of geological samples. Typically, the sample is irradiated, and a reconstruction algorithm characterizes the attenuation of volume elements that make up the sample. Volume elements or voxels having similar properties can then be grouped or "segmented" to define a structural element, such as a pore or a crystal phase.

A segmentation process can be performed at the end of one iteration of the reconstruction algorithm, to separate the volume into common material clusters. Then each cluster is processed in the forward model of the next iteration of the reconstruction to verify the integrity of the "combination of segmented data" with the acquisition.

CT can be performed uses a source or multiple sources that provide x-rays of more than one frequency. Information about attenuation at different frequencies can provide additional information about the sample, which may be useful for many purposes such as to segment the sample into different materials. Some dual-energy iterative reconstruction/segmentation have been proposed in the past.

One method provides employs the same segmentation for each cluster obtained from the original dataset. For example, suppose the segmentation extracts four clusters. By a dual iterative reconstruction/segmentation algorithm, one obtains both four sub-sinograms and four tomograms (one for each cluster). The four tomograms allow quantitative analysis (volumetric measurements, for instance), and since each is linked to its sinogram, one can also extract attenuation, Hounsfield windowing, and dose or radiation checking (in PET, or radiotherapy) directly from the projections. Further, since each cluster tomogram is supposed to be composed of one single "material", some methods reconstruct each voxel value as the amount of material which appears in the voxel, for example:

voxel=1->100% of the voxel contains the material of this cluster.

voxel=0.34->34% of the voxel contains the material of that cluster.

That is particularly helpful when one wants to vectorize the tomogram for 3D rendering. Since there is a dual checking between tomographic reconstruction and segmentation, a multi-material voxel will appear in several tomograms. In other words: the kind of "mixture of voxels" is verified during the iterations of the algorithm in order to check that the segmentation is consistent with the acquisition itself.

But, in these approaches, the segmentation is based on the intensity of the reconstructed voxels and on the local variation of intensities to determine the interfaces between clusters. In other words, such segmentation is based primarily on image characteristics.

SUMMARY

An object of the invention is to provide improved tomography for material characterization. Provided is a tomographic reconstruction and segmentation process, and system therefore, that produces a segmentation based on physical properties of materials using input from a materials library. In a preferred version, both reconstruction and segmentation update Z (atomic number) and rho (density) for volume elements at multiple iterations of the reconstruction algorithm. The preferred segmentation or clustering process uses a matching approach to known materials in the materials library, providing an updated label for a voxel, and not a clustering based only on voxel values and local intensity variations in the tomogram. "Labeling" in some embodiments corresponds somewhat to a segmentation; however, this segmentation is not based on the data only (where voxels or regions are separated from the others by the relative intensity difference observed locally between them) but by "voxel" matching (so that each voxel can be processed independently), using additional known data of the material dictionary. Dual-energy acquisitions facilitate the reconstruction of physical properties to provide this specific labeling/segmentation. Further, the result of the segmentation can be verified at the next iteration because the forward model employed in the tomographic reconstruction is also based on these same physical characteristics.

Some embodiments of the invention provide a method of determining a material characteristic of material in a sample by iterative tomographic reconstruction. The method conducts one or more X-ray tomography scans of a sample, and then determines one or more estimated material characteristics for multiple volume elements in the sample using a tomographic reconstruction algorithm. These estimated material characteristics are then modified by reference to stored known material characteristic data. Preferably, determining the composition of the sample volume during reconstruction includes segmenting the sample into regions of common composition, the segmenting being performed during iterative reconstruction instead of being based on the voxel characteristics determined upon the completion of iterative reconstruction. In some embodiments, the method further comprises labeling the reconstructed volume representing the sample into regions of materials having similar characteristics.

Preferred versions will perform one or more additional iterations of the tomographic reconstruction algorithm, where each iteration updates the one or more estimated material characteristics for the volume elements.

In some embodiments, modifying the estimated material characteristics by reference to material characteristics of known materials includes determining the known materials is based on a probabilistic classification to determine the most more likely material in the sample for each volume element. Modifying the estimated atomic numbers and estimated densities for at least one of the iterations includes modifying the numbers with a constrained update making the modified numbers to be closer to those of the determined most likely material in the materials dictionary.

Some embodiments of the invention provide a method of determining the atomic number and density of material in a sample by iterative tomographic reconstruction, including determining one or more estimated material characteristics for multiple volume elements in the sample using a tomographic reconstruction algorithm; and modifying the one or more estimated material characteristics by reference to stored material characteristic data. The reconstruction performs 3D tomographic reconstruction and 3D labeling of voxels based on material characteristics simultaneously in the same algorithm, any the bias the reconstruction introduces to the labeling (such as due to beam-hardening 'cupping' effects) can be corrected during subsequent iterations. Preferably, the labeling is based on chemical characteristics and not only on image characteristics, such as contrast or entropy.

It should be recognized that embodiments of the present invention can be implemented or embodied via computer hardware, a combination of both hardware and software, or by computer instructions stored in a non-transitory computer-readable memory. The methods can be implemented in computer programs using standard programming techniques—including a non-transitory computer-readable storage medium configured with a computer program, where the storage medium so configured causes a computer to operate in a specific and predefined manner—according to the methods and figures described in this Specification. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits programmed for that purpose.

Further, methodologies may be implemented in any type of computing platform that is operatively connected to a suitable tomography data scanning device, including but not limited to, personal computers, mini-computers, mainframes, workstations, networked or distributed computing environments, computer platforms separate, integral to, or in communication with charged particle tools or other imaging devices, and the like. Aspects of the present invention may be implemented in machine readable code stored on a non-transitory storage medium or device, whether removable or integral to the computing platform, such as a hard disc, optical read and/or write storage mediums, RAM, ROM, and the like, so that it is readable by a programmable computer, for configuring and operating the computer when the storage media or device is read by the computer to perform the procedures described herein. Moreover, machine-readable code, or portions thereof, may be transmitted over a wired or wireless network. The invention described herein includes these and other various types of non-transitory computer-readable storage media when such media contain instructions or programs for implementing the steps described above in conjunction with a microprocessor or other data processor. The invention also includes the computer itself when programmed according to the methods and techniques described herein.

Computer programs can be applied to input data to perform the functions described herein and thereby transform the input data to generate output data stored to non-volatile memory. The output information may also be applied to one or more output devices such as a display monitor. In preferred embodiments of the present invention, the transformed data represents physical and tangible objects, including producing a particular visual depiction of the physical and tangible objects on a display.

BRIEF DESCRIPTION OF THE DRAWINGS

FIG. 4(a-f) show the results for of several probabilistic matching functions compared to the reference image (at a central slice of the simulated object).

FIGS. 5(a-f) shows similar comparison of results in cases when the material dictionary is restricted to the chemicals composing the acquired sample.

FIGS. 6(a-c) show a similar comparison of results, side-by-side with the results of 4(e) and 5(e), using the probability function $\rho[Z^n\rho]$ in a constrained iterative update, the results showing a central slice of the resulting reconstructed/labelled data using respectively full-database and restricted-database.

DETAILED DESCRIPTION OF PREFERRED EMBODIMENTS

Figure 1A:
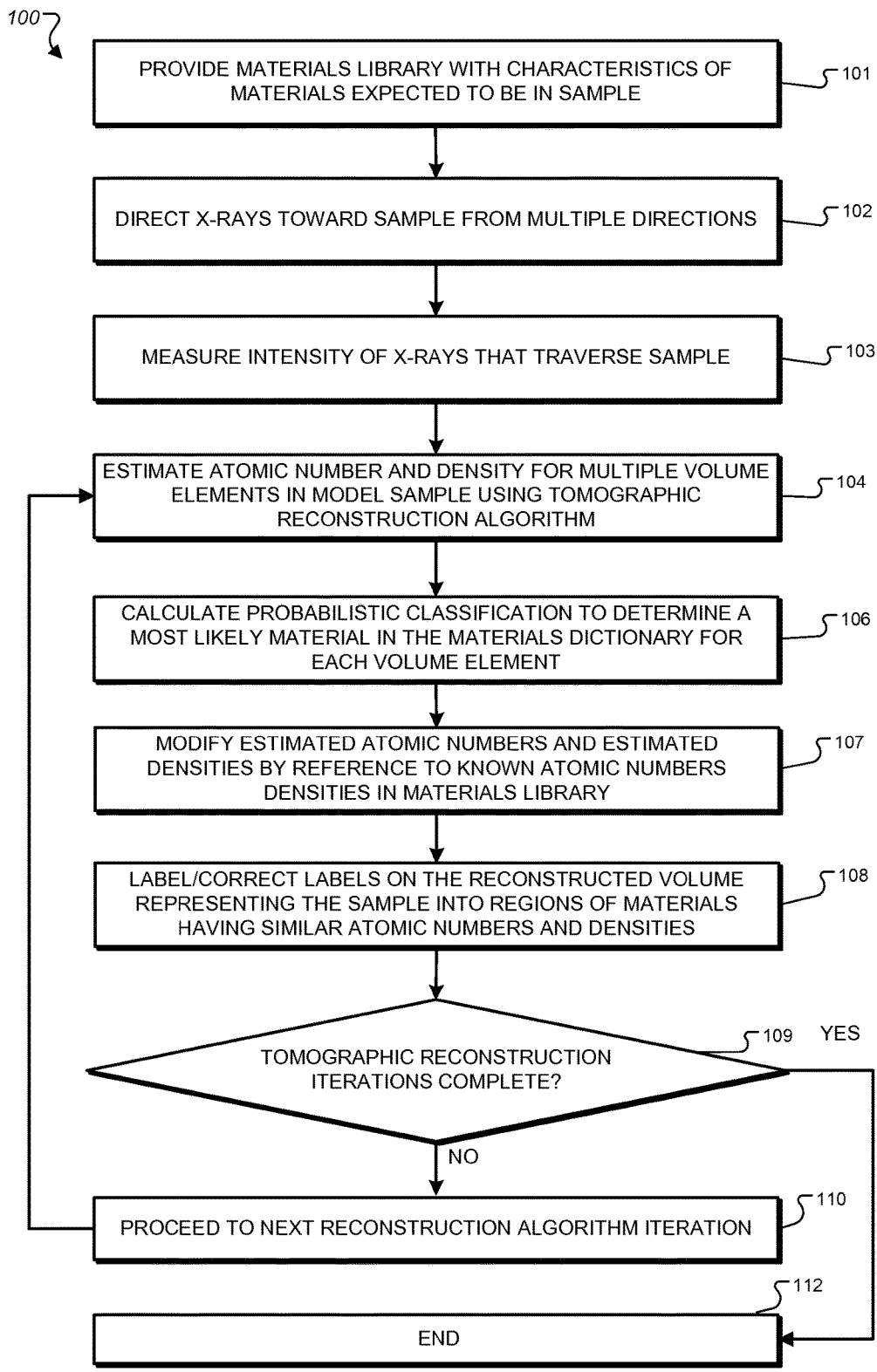
FIG. 1(a) is a flowchart of a process for tomographic reconstruction and segmentation according to some embodiments.

Provided is a tomographic reconstruction and segmentation process, and system therefore, that produces a segmentation based on physical properties of materials using input from a materials library. In a preferred version, both reconstruction and segmentation update Z (atomic number) and rho (density) for volume elements at multiple iterations of the reconstruction algorithm. The preferred segmentation process uses a best-matching approach to known materials in the materials library, providing an updated label for a voxel, and not a clustering based on voxel values and local intensity variations in the tomogram. "Labeling" in some embodiments corresponds somewhat to a segmentation; however, this segmentation is not based on the data only (where voxels or regions are separated from the others by the relative intensity difference observed locally between them) but by "voxel" matching (so that each voxel can be processed independently), using additional known data of the material dictionary. Dual-energy acquisitions facilitate the reconstruction of physical properties to provide this specific labeling/segmentation. Further, the result of the segmentation can be verified at the next iteration because the forward model employed in the tomographic reconstruction is also based on these same physical characteristics.

Various embodiments of the invention are described in detail in the papers "Dual-Energy Iterative Reconstruction for Material Characterization," *Proc. SPIE* 9212, Developments in X-Ray Tomography IX, 921213 (Sep. 11, 2014)).

Some embodiments provide a dual-energy ordered subsets convex method for transmission tomography based on material matching with a material dictionary. Such reconstruction includes a constrained update forcing material characteristics of reconstructed atomic number (Z) and density ($\rho$) volumes to follow a distribution according to the material database provided. Also provided is a probabilistic classification technique in order to manage this material distribution. The overall process produces a chemically segmented volume data and outperforms sequential labeling computed after tomographic reconstruction.

In the field of material characterization, dual-energy tomography can be used to recover the distribution of density, $\rho$, and atomic number, Z (or effective atomic number $Z_{eff}$), of a specimen by combining data acquired at two energies $E_1$ and $E_2$. Such a characterization is based on an attenuation $\mu_E(x)$ model at each point x of the acquired sample depending on both $\rho$ and Z according to the acquisition energy E:

$$\mu_E(x) = \frac{K_1}{E^k} Z^n(x)\rho(x) + K_2 f_{KN}(E)\rho(x) \quad (1)$$
$$= f_e^E(Z(x), \rho(x)) + f_{CS}^E(\rho(x))$$

Where $K_1$ and $K_2$ are two constants. First part of Eq. (1) refers to the photoelectric effect, denoted $f_e^E$-(.,.) appearing for low energy E and becoming negligible for high energies. The second part of Eq. (1) refers to Compton scattering, $f_{CS}^E$ (.) depending on the Klein-Nishina formula $f_{KN}(E)$ defined by:

$$f_{KN}(E) = \frac{1+\alpha}{\alpha^2} \left[ \frac{2(1+\alpha)}{1+2\alpha} - \frac{1}{\alpha} \ln(1+2\alpha) \right] + \frac{1}{2\alpha} \ln(1+2\alpha) - \frac{(1+3\alpha)}{(1+2\alpha)^2} \quad (2)$$
$$\text{where } \alpha = \frac{E}{510.975} \text{keV}$$

The first proposed algorithm consists of computing [$Z^n\rho$]-projections and $\rho$-projections from the both acquisitions to reconstruct [$Z^n\rho$] and $\rho$ volumes directly using a standard tomographic algorithm. (This approach is found in Alvarez, R. E. and Macovski, A., "Energy-selective reconstructions in x-ray computerised tomography," *Physics in medicine* *and biology* 21(5), 733 (1976).) An approach using polychromatic X-rays is found in two research papers (Siddiqui, S. and Khamees, A. A., "Dual-energy et-scanning applications in rock characterization," in [*SPE Annual Technical Conference and Exhibition* (*Society of Petroleum Engineers*, 2004)]; and Heismann B., Leppert, J and Stierstorfer, K., "Density and atomic number measurements with spectral x-ray attenuation method," *Journal of applied physics* 94(3), 2073-2079 (2003)). This approach estimates [$Z^n\rho$](x) and $\rho$(x) volumes by a 2-step process: i) reconstructing the attenuation volumes $\mu$(x, $E_1$) and $\mu$(x, $E_2$), and applying beam hardening correction, ii) recovering material characteristic volumes from attenuation volumes by solving an equation system based on Eq. 1 assuming two monochromatic measurements were used. Z(x) is often provided since it defines more accurately the chemical elements composing the acquired sample. However, extracting Z(x) from [$Z^n\rho$](x) is subject to the noise in $\rho$(x), leading to errors in material characterization.

One embodiment herein provides a solution using a dual-energy iterative reconstruction method based on the ordered subsets convex (OSC) algorithm for transmission tomography using the attenuation function Eq. (1) directly in the forward model of the reconstruction algorithm. During reconstruction, the process estimates the specimen physical characteristics by matching each voxel with a material dictionary. This estimation is based on a probabilistic classification allowing the process to allocate the most likely material in the dictionary for each voxel. The classification is verified during subsequent iterations of the algorithm, allowing false matchings to be corrected. The algorithm results in a reconstruction which is already segmented according to the physical properties of the scanned object.

This iterative process avoids the independence of the successive steps in the existing sequence of segmentation and labeling. Indeed, approximations during reconstruction can act dramatically on the rest of the sequence. Conversely, iterative processing as employed herein may correct for the labeling errors during the subsequent iterations. Additionally, several acquisition optimizations and dynamic tomography methods are developed by the present inventors and their research group at Australian National University (ANU), for the high cone-angle helical-scanning micro-CT facility at ANU. Some of these methods were proposed in Myers, G., "Improving dynamic tomography quality through a maximum a posteriori model," *SPIE Optics and Photonics-accepted at Optical Engineering and Applications*. (2014), which provides iterative schemes which may be adapted according to the techniques herein to include material characterization in addition to their own processing aim.

Below is described the investigation of several proposed material characterization schemes based on numerical simulation. The aim is to define the most likely functions performing an efficient and noise-robust voxel material labeling with respect to Z(x) and $\rho$(x) volumes; or [$Z^n\rho$](x) and $\rho$(x) volumes. Then we introduce the dual-energy iterative reconstruction algorithm including material characterization during the iterations.

Material Dictionary and Numerical Simulation

Figure 2:
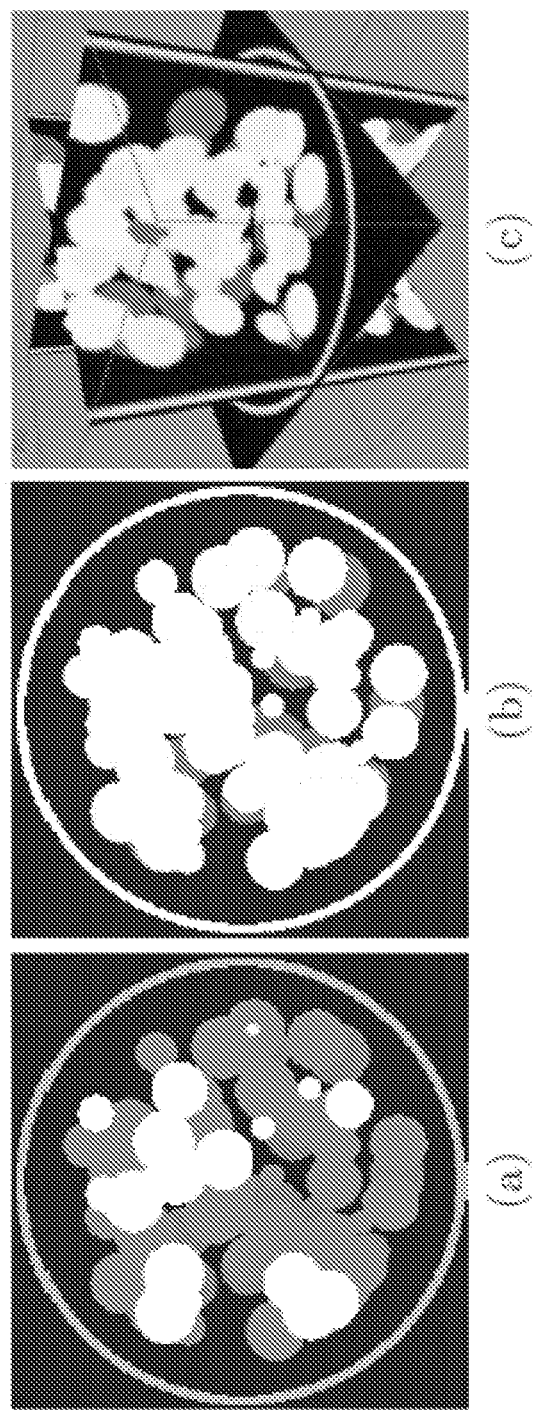
FIG. 2(a)-(c) show views of a synthetic object investigated with the techniques herein, the 2D central slices of Z(x) and ρ(x) volumes and a 3D multi-planar rendering of the object.

The study described below is based on a numerical analysis of a synthetic object simulating a rock sample. This sample is modeled using the material database provided on FIG. 7. The numerical sample is composed of a cylindrical container filled randomly with different spherical mineral grains. The mineral composition we have chosen is 60% of quartz, 20% kaolinite and 20% calcite. The analytic object is rasterized into an $N^3$ voxel volume for comparison with reconstructed data (i.e. $N^3$ corresponds to reconstructed volume size). FIGS. 2(a)-(c) show views of a synthetic object investigated with the techniques herein, the 2D central slices of Z(x) and ρ(x) volumes and a 3D multi-planar rendering of the object shaded with the labels given in FIG. 7. In the depicted views of the simulated object, (a) shows a central slice of the object Z(x) volume, (b) shows a central slice of object ρ(x) volume, and (c) shows a 3D visualization of the object imaged into a $512^3$ voxel volume.

Figure 3:
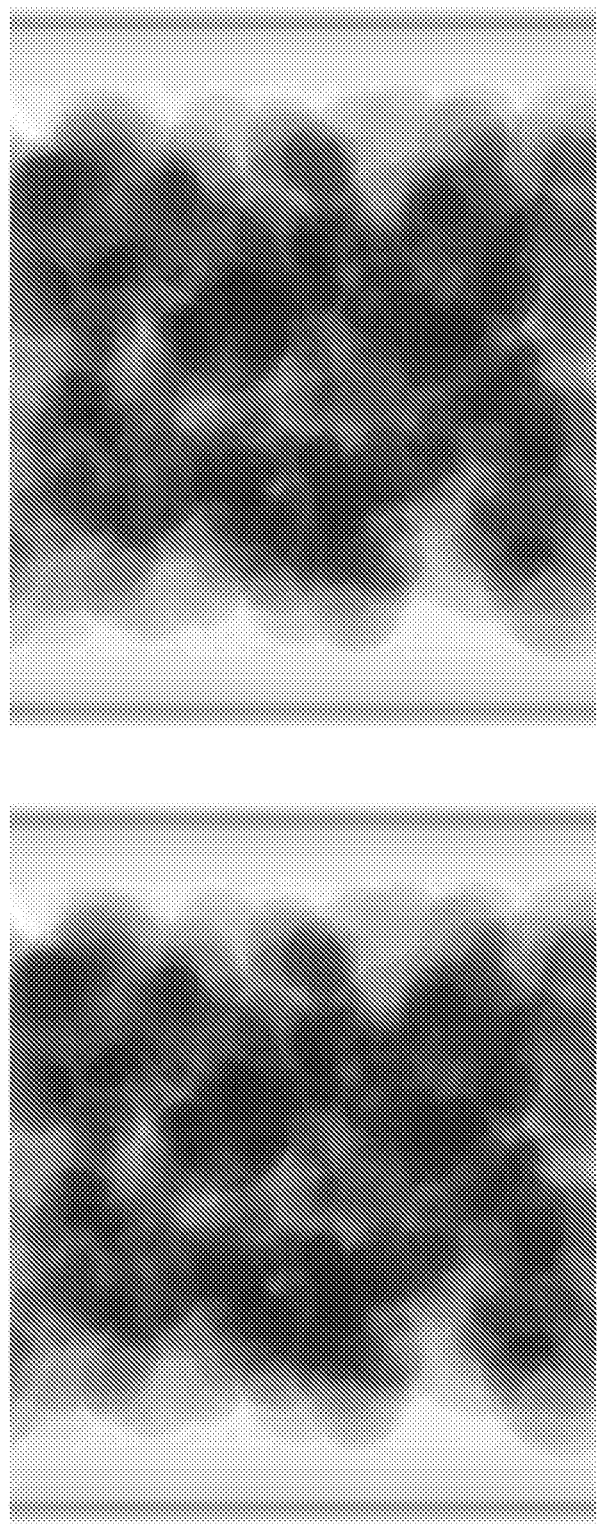
FIG. 3(a)-(b) shows a projection of the simulated object computed assuming monochromatic X-rays with energies of 60 keV and 120 keV respectively.

The synthetic object is acquired by a simulated acquisition using a detector with four times with the number of pixels chosen, to prevent the inverse crime effect that can occur when using synthetic data. X-ray lines (from source to each pixel of the detector) are traced with respect to the scanner geometry. Distances crossed by each X-ray line in each material composing the object are measured and total absorption is computed for each sub-pixel ii by $A(ii) = \Sigma_{m \in M_s} \int \mu_{E,m}(x) dx$, where $M_s$ is the material set composing the sample and $\mu_{E,m}$ corresponds to $\mu_E$ (Eq. 1) for material m. The process of this embodiment obtains the final projection value on the detector by averaging the four sub-pixel values and assuming a Poisson noise model:

$$R(i) = \text{Poisson}\left\{ \sum_{ii \in i} \gamma_0 \exp(-A(ii)) \right\} \quad (3)$$

where $\gamma_o$ is the average photon counts emitted (blank scan) and $ii \in i$ denotes sub-pixel indexes contained in the detector pixel i. For example, FIG. 3 shows a projection computed assuming x-ray energies of 60 keV and 120 keV from the simulated object. In this study, reconstructed volume size is $N^3 = 256^3$ voxels and detector size is 256×192 pixels. Thus, acquisitions have been performed using 512×384 detector size at each energy level and downsampled to 256×192 in order to reconstruct $256^3$ volumes.

Ordered Subsets Convex Reconstruction

The well-established iterative expectation maximization (EM) algorithm refers to a wide class of tomographic reconstructions providing 3D structural volume of the sample from a set of radiographs. The expectation to observe the measurements, R, according to a given sample, μ, denoted ρ(R|μ) follows a Poisson distribution which can be defined by:

$$p(R|\mu) = \prod_i \frac{e^{-\hat{R}(i)}(\hat{R}(i))^{R(i)}}{R(i)!}, \quad (4)$$

where i is a projection line index and R^, the expected number of counted photons at detector position i is:

$$\hat{R}(i) = \gamma_0 e^{-\Sigma_j \omega_{ij} \mu(j)}, \quad (5)$$

where wij is a weight coefficient defining the voxel j contribution on the detector measurement i. wij is usually proportional to the distance travelled by the line i in the voxel j. Based on the likelihood ρ(R|μ) and the transmission model R^, the method works by maximizing the log likelihood L=log ρ(R|μ), i.e. finding the solution μ that maximizes L with respect to μ by finding a zero root of the partial derivative ∂μL. The solution can be achieved by the Newton-Raphson method iterating in t:

$$\mu_{t+1} = \mu_t - \frac{\partial_{\mu_t} L}{\partial^2_{\mu_t} L} \quad (6)$$

A penalization ρ(μ) is introduced in addition to ρ(R|μ) to stabilize the solution and avoid divergence during the Iterations. ρ(μ) is defined with respect to the Gaussian distribution of reconstructed data by:

$$p(\mu) = e^{-\beta \sum_j \sum_{k \in N(j)} y_{jk} \Phi(\mu(j) - \mu(k))}, \quad (7)$$

where β is a relaxation parameter, N(j) denotes the neighbourhood of pixel j, Φ(.) is a potential function and $y_{jk}$ a weight factor (usually inverse proportional to the distance between voxels j and k). In this version, the following Log Cos h function is used as the potential of the regularization:

$$\Phi(x) = 2gt^2 \log\cosh\left(\frac{|x|}{t}\right), \quad (8)$$

where g is a sensitivity parameter. This function attenuates the small variations leading to a better homogeneity of the regions and preserves the edges beyond the given threshold t. By replacing L=log ρ(R|μ)ρ(μ) in Eq. (6), the overall penalized ordered subsets convex (OSC) algorithm consists of iterating in t and subsets s+1 in order to update each voxel j of the volume μ until convergence of the solution:

$$\mu^t_{s+1}(j) = \mu^t_s(j) + \alpha^t \Delta \mu^t_s(j), \quad (9)$$

$$\Delta \mu^t_s(j) = \frac{\sum_{i \in S(s)} \omega_{ij}(\hat{R}^t_s(i) - R(i)) - \beta \sum_{k \in N(j)} y_{jk} \Phi'(\mu(j) - \mu(k))}{\sum_{i \in S(s)} \omega_{ij}\left[\sum_l \omega_{il}\right]\hat{R}^t_s(i) + \beta \sum_{k \in N(j)} y_{jk} \Phi''(\mu(j) - \mu(k))}$$

where $\hat{R}^t$(i) is the expected photon counts computed from $\mu^t$ using Eq. (5), $\alpha^t$ is a relaxation parameter, S(s) are the radiographs in the subset s and $\Phi'$(.) and $\Phi''$(.) are respectively the first and second derivative of Φ(.). The volume obtained by the update using the subset s is used as starting volume of the next subset s+1. A main iteration t is completed when all subsets have been processed.

Material Characterization: A Simulation Study

Let $\mu E_1(x)$ and $\mu E_2(x)$ be the tomograms reconstructed respectively from two acquisitions at energies $E_1$ and $E_2$ with the standard OSC algorithm. One can recover the volume pairs (Z, ρ) or ([$Z^n$ρ], ρ) by solving one of the following equation systems at each voxel x:

$$\begin{cases} \mu_{E_1}(x) = A_1 Z^n(x)\rho(x) + B_{1\rho}(x) \\ \mu_{E_2}(x) = A_2 Z^n(x)\rho(x) + B_{2\rho}(x) \end{cases} \text{or} \quad (10)$$

$$\begin{cases} \mu_{E_1}(x) = A_1 [Z^n \rho](x) + B_{1\rho}(x) \\ \mu_{E_2}(x) = A_2 [Z^n \rho](x) + B_{2\rho}(x) \end{cases} \text{where } A_1 = \frac{K_1}{E_1^k},$$

$$B_1 = K_2 f_{KN}(E_1), A_2 = \frac{K_1}{E_2^k} \text{ and } B_2 = K_2 f_{KN}(E_2).$$

This section defines and compares several probabilistic material matching functions estimating that a reconstructed voxel corresponds to a material in the material dictionary. Since one can determine ρ, Z or [Z"ρ] using Equation 10, a matching function will be based on a comparison of one or several reconstructed material characteristics with their inherent values in the material database.

We consider that reconstructed data Z(x), ρ(x) and [Z"ρ](x) each follow a Gaussian distribution around an effective material value. Then we can define the probability that a voxel x corresponds to a material m∈M by the following functions:

$$\begin{cases} p_\rho = p(\rho(x) = \rho_m) = \exp(-(\rho(x) - \rho_m)^2 / \sigma_{\rho_m}^2) \\ p_Z = p(Z(x) = Z_m) = \exp(-(Z(x) - Z_m)^2 / \sigma_{Z_m}^2) \\ p_{[Z^n\rho]} = p([Z^n\rho](x) = [Z^n\rho]_m) = \\ \exp(-([Z^n\rho](x) - [Z^n\rho]_m)^2 / \sigma_{[Z^n\rho]_m}^2) \end{cases} \quad (11)$$

or a combination of them such that:

$$\begin{cases} p_{Z\rho} = p(Z(x) = Z_m)p(\rho(x) = \rho_m) \\ p_{[Z^n\rho]\rho} = p([Z^n\rho](x) = [Z^n\rho]_m)p(\rho(x) = \rho_m) \end{cases} \quad (12)$$

where $\rho_m$, $Z_m$ and $[Z^n\rho]_m$ are the chemical characteristics of material m in the dictionary M and $\sigma_{\rho_m}$, $\sigma_{Z_m}$ and $\sigma_{[Z^n\rho]_m}$ are its respective standard deviations. Large standard deviations will result in a non-accurate estimation since all materials in the dictionary will achieve a good probability (smooth estimate). Conversely, too small deviations will lead to overly-discriminant estimation. Let $a_m$ be one of the comparison value for material m (i.e. $a_m = \{\rho_m, Z_m$ or $[Z^n\rho]_m\}$). We denote $a_n$ the corresponding value for the material n∈M such that n≠m and $a_n = \mathrm{argmin}\{a_m - a_{m_i}, m_i \in M \wedge m_i \neq m\}$. We define the standard deviation $\sigma_a$ of m for the material characteristic a by:

$$\sigma_a^2 = \frac{(a_m - a_n)^2}{4\ln(p_t)} \quad (13)$$

where $p_t \in \{0, 1\}$ define the distinguishability between in and its closer neighborhood n in the material dictionary. Setting such a standard deviation for each material allows to locally adjust the difficulty of the probabilistic matching function with respect to the chemicals composing the database. A summary of the three single best-matching functions (Eq. 11) is provided in Table 1. The functions listed are not limiting, however, and other suitable functions may be used.

The present inventors provide data from investigating the probability material distributions of the material database of FIG. 7 according to the five matching functions (Eq. 11 and Eq. 12) ($p_t$=0.8 in this example) in the incorporated paper entitled "Dual-Energy Iterative Reconstruction for Material Characterization." Particularly, the results show the favorable impact on the distribution when using a restricted material database (containing only the chemicals which are used in the numerical sample) compared to a larger or full database for the same probability function.

TABLE 1

Singular matching functions investigated according to the reconstructed ρ(x), Z and/or [Z"ρ] volumes. Complex matching functions (Eq. 12) are obtained by combination of $p_\rho$ with pZ or pZ"ρ.

| $p_\rho$ | $p_Z$ | $p_{Z''\rho}$ |
|---|---|---|
| $p(\rho(x) = \rho_m)$ | $p(Z(x) = Z_m)$ | $p([Z^n\rho](x) = [Z^n\rho]_m)$ |
| $e^{\left(-\frac{(\rho(x)-\rho_m)^2}{\sigma_{\rho_m}^2}\right)}$ | $e^{\left(-\frac{(Z(x)-Z_m)^2}{\sigma_{Z_m}^2}\right)}$ | $e^{\left(-\frac{([Z^n\rho](x)-[Z^n\rho]_m)^2}{\sigma_{[Z^n\rho]_m}^2}\right)}$ |
| $\sigma_{\rho_m}^2 = \frac{(\rho_m - \rho_n)^2}{4\ln(p_t)}$ | $\sigma_{Z_m}^2 = \frac{(Z_m - Z_n)^2}{4\ln(p_t)}$ | $\sigma_{[Z^n\rho]_m}^2 = \frac{([Z^n\rho]_m - [Z^n\rho]_n)^2}{4\ln(p_t)}$ |
|  |  | $\sigma_{\rho_m}^2 = \frac{(\rho_m - \rho_n)^2}{2\ln(p_t)}$ |
| $\rho_n = \mathrm{argmin}\{\rho_m - \rho_{m_i}\}$ $m_i \in M \wedge m_i \neq m$ | $Z_n = \mathrm{argmin}\{Z_m - Z_{m_i}\}$ $m_i \in M \wedge m_i \neq m$ | $[Z^n\rho]_n = \mathrm{argmin}\{[Z^n\rho]_m - [Z^n\rho]_{m_i}\}$ $\rho_n = \mathrm{argmin}\{\rho_m - \rho_{m_i}\}$ $m_i \in M \wedge m_i \neq m$ |

In order to quantify the efficiency of each matching function, we first compute numerical acquisitions at two energies using the simulation explained above. Then, we reconstruct the volumes ($\mu_1$, $\mu_2$) using the OSC algorithm detailed above. We estimate the volumes (Z, ρ) and ([Z"ρ], ρ) by solving Eq. 10 for each voxel.

Finally, we apply the classification labeling using each matching function. This classification labels each voxel with the material m∈M such that m maximizes the used probability function. The shaded images of FIGS. 4(b-f) show the results for each method compared to the reference image (central slice of the simulated object). The number of correct labeling (Corr. in % on FIG. 4) demonstrates that each function has correctly recovered at least 50% of the voxels composing the sample from full dictionary. The best result is obtained using ρZρ, even if we can observe that differences between different results are not significant. FIGS. 5(b-f) shows most-likely material results when the material dictionary is restricted to the chemicals composing the acquired sample. The labeling process achieves a better result whatever the matching function. However we can note the high results obtained by $\rho_Z$ and $\rho[Z''\rho]$ compared to the others. Thus one can expect to perform an accurate matching from $(Z, \rho)$ volumes as well as from $([Z^n\rho], \rho)$ volumes.

Dual Energy Reconstruction and Material Matching

We have observed in herein that a material labeling can be performed from $(Z, \rho)$ as well as from $([Z^n\rho], \rho)$ volumes. The tier has the advantage to be not limited by the noise in $\rho$ volume. However the matching process developed in the previous section is performed after tomographic reconstruction whereas it could be done during an iterative reconstruction technique, allowing false matching to be corrected during subsequent iterations of the algorithm. Thus we develop now a modified dual-energy OSC, algorithm based on the reconstruction of $([Z^n\rho], \rho)$ volumes and including a constrained update of the voxels at each iteration. This update enforces each voxel under-reconstruction to be closer to the most likely material in the database.

The forward model of the algorithm is based on the previous estimate of $([Z^n\rho]_{s-1}{}^t, \rho_{s-1}{}^t)$. Thus $\mu E_1(j)$ and $\mu E_2(j)$ in Eq. 5 are given by:

$$\begin{cases} \mu_{E_1}(x) = A_1[Z^n\rho]_{s-1}^t(x) + B_1\rho_{s-1}^t(x) \\ \mu_{E_2}(x) = A_2[Z^n\rho]_{s-1}^t(x) + B_2\rho_{s-1}^t(x) \end{cases} \quad (14)$$

Then we obtain the update values $\Delta\mu^t(x, E_1)$ and $\Delta\mu^t(x, E_2)$ by applying the OSC update step Eq. 9 separately by applying the OSC update step Eq. 9 separately for E1 and E2. Let $\Delta[Z^n\rho]^t(x)$ and $\Delta\rho^t(x)$ the update values of $([Z^n\rho]_{s-1}{}^t, \rho_{s-1}{}^t)$. They are recovered by solving for each x:

$$\begin{cases} \Delta\mu_s^t(x, E_1) = A_1[Z^n\rho]_s^t(x) + B_1\Delta\rho_s^t(x) \\ \Delta\mu_s^t(x, E_2) = A_2[Z^n\rho]_s^t(x) + B_2\Delta\rho_s^t(x) \end{cases} \quad (15)$$

We add a constrained update at the end of each super-iteration t based on best-matching functions. This update consists of modifying $[Z^n\rho]^t(x)$ and $\rho^t(x)$ if the most likely material m is such that $p\alpha = p(x=m) > p\beta$, where $p\beta$ is a probability threshold. In such a case, the constrained update performs as follows:

$$\begin{cases} [Z^n\rho]^t(x) \leftarrow p_\alpha[Z^n\rho]^t(x) + (1-p_\alpha)[Z^n\rho]_m \\ \rho^t(x) \leftarrow p_\alpha\rho^t(x) + (1-p_\alpha)\rho_m \end{cases} \quad (16)$$

where $[Z^n\rho]_m$ and $\rho_m$ are the chemical characteristics of m. This constrained update enforces reconstructed data to be closer to the theoretical values of a material m in the dictionary if m is the best likelihood and $p(x=m)$ already provides a high probability (greater than threshold $p_\alpha$). Matching providing a best estimate below $p_\alpha$ are not modified by the constrained update. This constraint has the advantage of making the solution closer to the material in the dictionary.

This algorithm is now applied using the same set of acquisitions at $E_1$ and $E_2$ employed in the previous section. We have set in this example $p\beta = p_t = 0.8$, and we have used the probability function $p[Z^n\rho]$ in the constrained update since it has provided the average best results in the preliminary study. The central slices of the resulting reconstructed/labelled data are shown on FIGS. 6(b-c) using respectively full-database and restricted-database. This technique has correctly labeled more than 66% (resp. 87%) of the voxels containing the sample from the full (resp. restricted) material database, compared with 54% and 77% from reconstruction followed by segmentation/labelling. Thus we observe a gain of more than 10% for the same probability function when using the iterative reconstruction with constraint. These results demonstrate the effectiveness of combining tomographic reconstruction with material labeling. However, the results still suffer from material labeling errors, due to noise and partial volume effects.

Above are described several probabilistic techniques to label each voxel of a tomogram according to the physical characteristics contained in a material dictionary. These matching techniques are based on a local distinguish-ability of each material in the database with respect to its closest neighbourhood. Thus one can achieve a material labeling from $(Z, \rho)$ or $([Z^n\rho], \rho)$ volumes with equivalent quantitative results. However, if segmentation followed by labeling is performed, the material labeling is difficult to correct according to physical models. Further, since iterative reconstructions can incorporate physical interactions with X-Ray radiations according to material characteristics, we have provided a dual-energy OSC algorithm, based on the reconstruction of $([Z^n\rho], \rho)$ volumes, including a constrained update at the end of each iteration. This additional update enforces the values of $([Z^n\rho], \rho)$ to be closer to the theoretical values of the material m which provides the best probability. Such a process achieves both a better reconstruction of the object and a more accurate labeling compared to a process performing tomographic reconstruction and material classification sequentially. The above embodiments are extended to apply to two polychromatic spectra by applying beam-hardening correction and then assuming two monochromatic energies (as Siddiqui et al. and Heismann et al. provide). These techniques extract $([Z^n\rho], \rho)$ projections to reconstruct $([Z^n\rho], \rho)$ volumes, avoiding intermediates $\Delta\mu^t(x, E^1)$ and $\Delta\mu^t(x, E_2)$ and correcting for polychromatic spectra at once. Various embodiments that employ dual polychromatic x-ray spectra centered at different energies may include a combination of these techniques with the dual reconstruction/labeling set forth herein.

FIG. 1(a) is a flowchart of a process for tomographic reconstruction and segmentation according to some embodiments. Process 100 starts at block 101 with providing a materials library or data store with characteristics of materials expected to be in the sample. In this version, the characteristics include at least the atomic number (Z) and density ($\rho$) for the expected materials. The data store may include data for any material that can be examined with tomography, such as medical (live or tissue samples), mineral, or semiconductors, for example. As discussed above, the data store is preferably limited to materials that are expected to be or will probably be in the sample, selected based on the type of sample analyzed. The data store may include more materials, such as materials that may be, but do not have a high likelihood of being in the sample. Some processes may include the step of selecting a data store to use based on the type of sample being analyzed. Referring to FIG. 1(c), which shows a block diagram of one example system, the materials library or data store 19 is shown containing a plurality of material characteristics, each set of material characteristics associated with a respective material as discussed.

Next at blocks 102 and 103, the process conducts the tomography data acquisition by directing X-rays toward the sample from multiple directions, and measuring the intensity of X-rays that traverse the sample. Any suitable tomography X-ray process may be conducted, including those with multiple X-ray energy spectrum such as the dual-energy acquisition process described above. Other versions may use more than two energy levels, such as three or four, and some may use only one energy level. As noted, the process may use emissive tomography or transmissive tomography depending on the type of sample examined such as medical (live or tissue samples), mineral, or semiconductors, for example.

As shown in the schematic block diagram of FIG. 1(c), the tomography X-ray scan and detection is preferably conducted under control of a system controller 15, which issues commands to the dual energy X-ray beam 11 to irradiate sample 13 as desired. A rotating sample holder or sample state 14 holds the sample and rotates it to achieve the desired number of tomography projections. X-ray detector 12 measures the intensity of X-rays passing through the sample. Tomography system 10 of FIG. 1(c) may be incorporated into another scanning device such as scanning electron microscope (SEM), as device described in U.S. Provisional App. No. 61/981,330 titled "X-Ray Microscopy and Tomography Imaging Methods and Structures," which application was converted into U.S. patent application Ser. No. 14/645,689, filed Mar. 12, 2015, titled "High Aspect Ratio X-Ray Targets And Uses Of Same" both of which applications are hereby incorporated by reference. Such a device for implementing one embodiment of the invention includes an electron source, an electron focusing column for focusing the electrons from the source into a beam, a target that emits x-rays when impacted by the electron beam, the x-rays passing through the sample and being detected by one or more x-ray detectors. In other versions, the x-ray emitter 11 may direct-rays toward a sample from multiple directions from a synchrotron. The system controller 15 will typically be embodied as a microprocessor motherboard or computer with a user interface 16 having a display and user input devices. Processor 17 is operatively connected to a memory for storing the materials library 19, instruction code for the tomography reconstruction and segmentation, and drivers/controller software for the devices 11, 12, and 14. The processor 17 may include a specialized image graphics processor or one or more separate graphics cards for accelerating the analysis and display of the tomographic data.

Referring again to FIG. 1(a), after acquiring the tomographic data, the process 100 goes to block 104, where it begins a tomographic reconstruction and segmentation algorithm to determine the atomic number and density of material in the sample by iterative tomographic reconstruction. Block 104 determines an estimated atomic number and an estimated density for multiple volume elements in the sample using a tomographic reconstruction algorithm, such as one of the suitable algorithms described above. Next at block 106, the process calculates a probabilistic classification to determine a most likely material in the materials dictionary for one or more volume elements. The calculation at this step may include any suitable probabilistic classification function including those described above as having the best performance, those evaluated as not performing as well, and other suitable classification functions.

Next, at block 107, the process modifies the estimated atomic numbers and estimated densities by reference to atomic numbers and densities of known materials from the materials library or data store. Preferably, as discussed, this step employs the result of the classification function from the previous step, and uses the characteristics of the identified most likely material. In some embodiments, this step includes modifying the numbers with a constrained update including a threshold such as those described above, making the modified numbers to be closer to those of the determined most likely material in the materials dictionary.

Next at step 108, the process labels the reconstructed volume elements representing the sample into regions of materials having similar atomic numbers and densities. Preferably the label indicates that the region of material is made up of determined most likely material, or includes the most likely material. For instances where step 108 is reached in a further iteration of the process, step 108 may update the label of the volume elements, which may change previously identified regions in the reconstructed model. It is noted that the label may be a separate data element from the estimated properties for the respective volume element that used in the reconstruction algorithm. The labels may be a data element that creates an association with one or more surrounding volume elements (voxels) for the respective updated volume element, or may label the voxels of the identified region's boundaries, or may merge or associate voxels together according to known techniques for representing voxel data that in the field have previously been employed during a segmentation process following the tomographic reconstruction, as discussed in the background.

Next at block 109, the process determines if the iterations of the tomographic reconstruction and segmentation algorithm are complete. This block may include checking for convergence of the data (that is the data has not significantly changed from the previous iteration), or may involve checking if a predetermined number of iterations have been completed, the number of iterations being selected based on the type of sample or observed complexity of the sample's three-dimensional structure. Other suitable methods for determining if the iterations are complete may be used. If the iterations are not complete at block 109, the process goes to block 110 where it proceeds to the next iteration of reconstruction algorithm, in this version going back to block 104 but using the current data in the voxel representation of the sample. If the iterations are complete at block 109, the process goes ends at block 112 with the current atomic numbers, densities, and labels for the volume elements representing the sample being the output of the reconstruction algorithm. Preferably, each iteration through the depicted steps of the tomographic reconstruction algorithm updates the modified atomic numbers and densities for the volume elements.

Figure 1B:
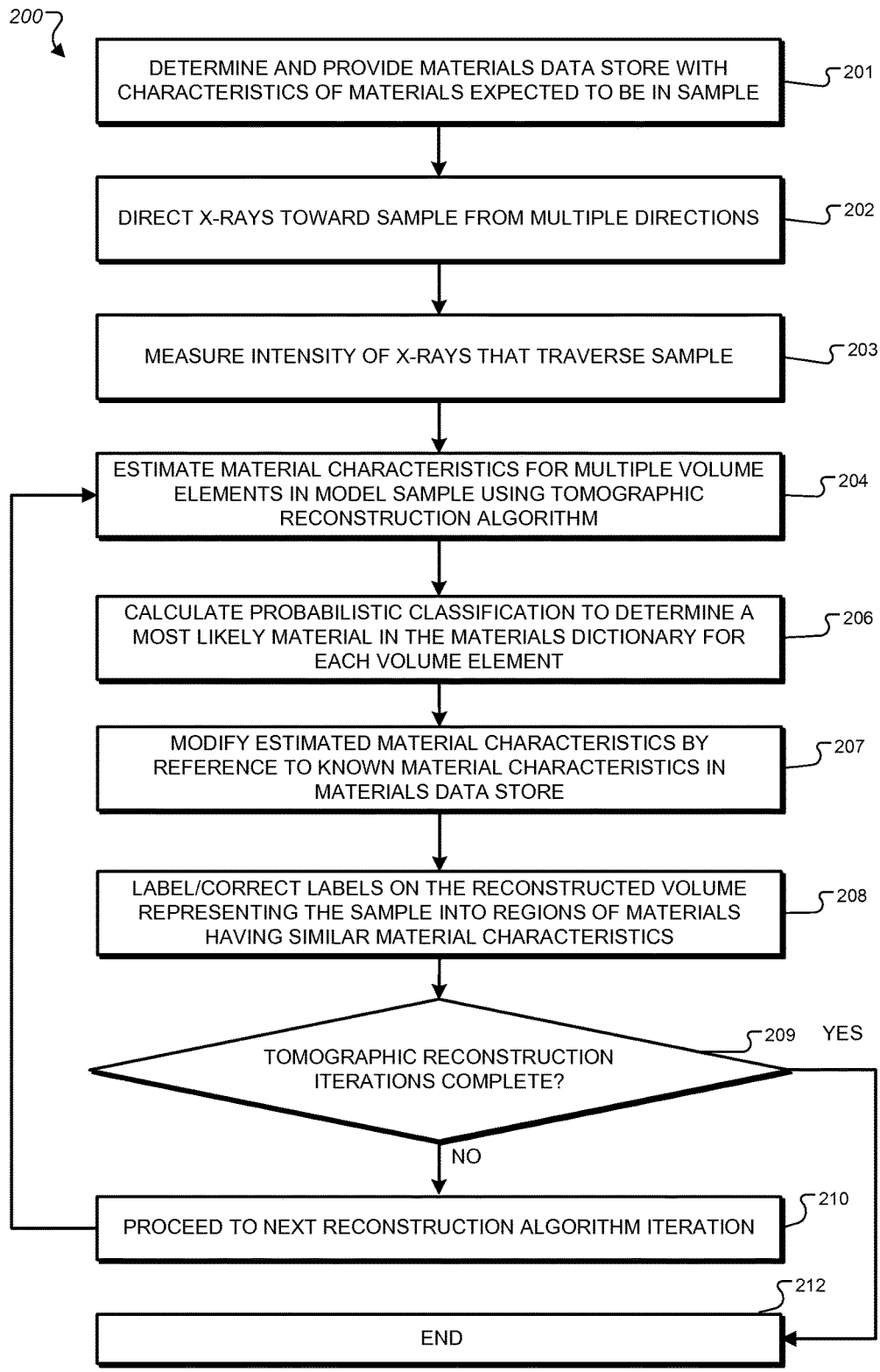
FIG. 1(b) is a flowchart of a process for tomographic reconstruction and segmentation according to other embodiments.
Figure 1C:
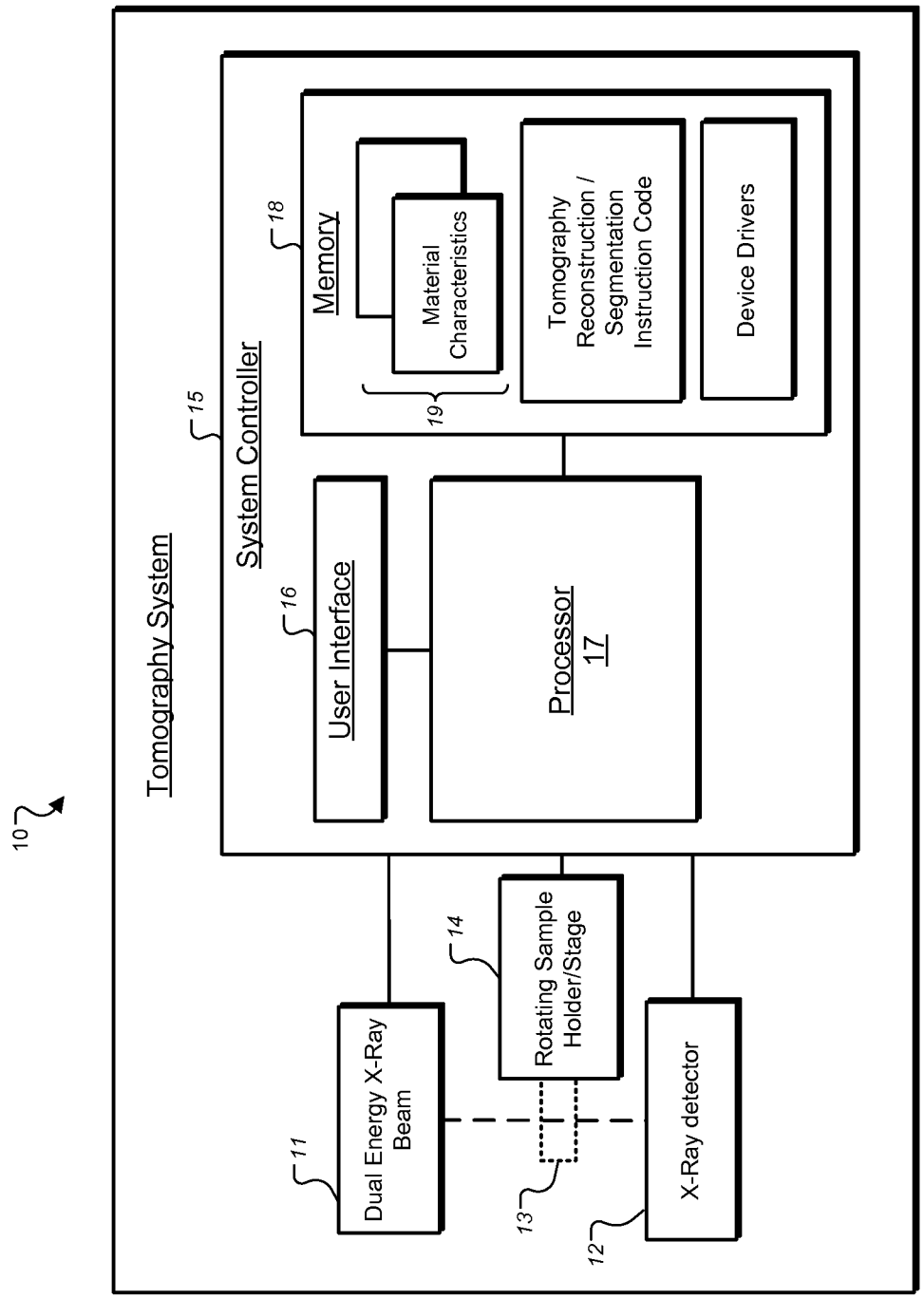
FIG. 1(c) is a schematic block diagram of one example system according to an example embodiment.

FIG. 1(b) is a flowchart of a process for tomographic reconstruction and segmentation according to other embodiments. Process 200 starts at block 201 with determining and providing a materials library or data store with characteristics of materials expected to be in the sample. The remainder of the process goes similarly to that described with regard to FIG. 1(a), with this flowchart provided to show that various embodiments may use other data characteristics. In various embodiments, the material characteristics estimated at block 204, and adjusted at block 207 with reference to data stored in the data store can be any suitable characteristic that can be measured or derived from any type of tomographic scan, directly or indirectly. For example, with embodiments that employ emissive tomography data scans, the intensity level of the scan may relate to the concentration of radioactive elements or other tracers introduced into the sample or subject under study. In positron emission tomography (PET) for example, the system detects pairs of gamma rays (or annihilation photons) emitted indirectly by a positron-emitting radionuclide (tracer), which has been introduced into the body on a biologically active molecule. A PET scan device is used in such embodiments. As another example, the material dictionary or data store 19 may store mass attenuation coefficient data for X-ray, gamma-ray, or bremsstrahlung, and the tomography scanning method use may measure the transmission of these. As another example, the estimated material characteristics may be the X-ray attenuation at multiple energy levels, for example one, two, three, or four energy levels, or a full attenuation curve of as a function of X-ray energy. Further material characteristics employed in the estimation of block 204, the classification and labelling of blocks 206 and 207 may be a different characteristic or set of characteristics, and such characteristics may vary between different iterations of the algorithm. For example, one embodiment uses atomic numbers and densities to assign the volume element a label, but then uses the further, different information about the material, such as the full attenuation curve as a function of X-ray energy, in the forward estimation or simulation of the iterative reconstruction, or the probabilistic classification. As discussed above, the data store is preferably limited to materials that are expected to be or will probably be in the sample, which selected based on the type of sample analyzed. In some embodiments, block 201 includes selecting a material library to use based on the type of sample involved.

It should be noted that while steps 204, 206, 207, and 208 are described in this version, other embodiments may not include all of these steps, or may include less than all of these steps in a particular iteration. For example, some versions may not include labeling. As discussed above, the tomographic reconstruction algorithm conducted at block 204 may include any suitable algorithm such as Algebraic Reconstruction Technique (ART), Simultaneous ART, Simultaneous iterative reconstruction technique (SIRT), Ordered subset SIRT, Multiplicative algebraic reconstruction technique, Maximum likelihood expectation-maximization, Ordered subset expectation-maximization, Ordered subset convex algorithm, Iterative coordinate descent (ICD), Ordered subset ICD, or Model-based iterative reconstruction, for example. Further, the process may include correcting the data using a tomographic algorithm that corrects for beam hardening.

Preferably, determining the composition of the sample volume during reconstruction includes segmenting the sample into regions of common composition, the segmenting being performed during iterative reconstruction instead of being based on the voxel characteristics determined upon the completion of iterative reconstruction. In some embodiments, the method further comprises labeling the reconstructed volume representing the sample into regions of materials having similar characteristics.

Preferred versions will perform one or more additional iterations of the tomographic reconstruction algorithm, where each iteration updates the one or more estimated material characteristics for the volume elements.

In some embodiments, modifying the estimated material characteristics by reference to material characteristics of known materials includes determining the known materials is based on a probabilistic classification to determine the most more likely material in the sample for each volume element. Modifying the estimated atomic numbers and estimated densities for at least one of the iterations includes modifying the numbers with a constrained update making the modified numbers to be closer to those of the determined most likely material in the materials dictionary.

While the preferred embodiments described above employs dual energy ordered subsets convex method for transmission tomography, the invention is applicable to any type of iterative tomographic reconstruction. The techniques herein can be employed with emission tomography techniques as well as transmission tomography. Further, while the preferred embodiment above includes determining atomic number and density and comparing those characteristics to atomic number and density of known materials in a materials dictionary, the invention is applicable to determining any material characteristic. Further, the reference materials characteristics could be stored in other forms, such as in an attenuation table.

Another aspect of the invention provides a method of correcting an image for beam hardening, as set forth in the paper "Correction of Beam Hardening Artefacts in Microtomography for Samples Images in Container," *Proc. SPIE* 9212, Developments in X-Ray Tomography IX, 92120A (Sep. 11, 2014)), which paper is part of the parent application hereto.

Some embodiments of the invention provide a method of determining the atomic number and density of material in a sample by iterative tomographic reconstruction, comprising:

A. directing x-rays toward a sample from multiple directions;

B. measuring the x-ray intensity of x-rays that have traversed the sample;

C. determining an estimated atomic number and an estimated density for multiple volume elements in the sample using a tomographic reconstruction algorithm; and D. modifying the estimated atomic numbers and estimated densities by reference to atomic numbers and densities of known materials from a materials library.

In some embodiments, the method further comprises performing one or more additional iterations of the tomographic reconstruction algorithm where each iteration updates the modified atomic numbers and densities for the volume elements.

In some embodiments, at least one of the additional iterations further comprises modifying the updated estimated atomic numbers and estimated density densities using atomic numbers and densities of known materials from the materials library.

In some embodiments, modifying the estimated atomic numbers and estimated densities by reference to atomic numbers and densities of known materials from a materials library includes determining the known materials is based on a probabilistic classification to determine the most likely material in the sample for each volume element.

In some embodiments, the method further comprises labeling the reconstructed volume representing the sample into regions of materials having similar atomic numbers and densities.

In some embodiments, the labeling occurs at least once during iterative reconstruction of the sample data.

In some embodiments, directing x-rays toward a sample from multiple directions includes two or more steps, each step comprising directing x-rays toward the sample with an energy or energy spectrum different from that used in other steps.

In some embodiments, the x-rays directed towards the sample contain a spectrum of energies and measuring the x-ray intensity of x-rays that have traversed the sample further comprises measuring information about the energy spectrum of x-rays that have traversed the sample.

In some embodiments, the materials library includes minerals.

In some embodiments, the materials library includes materials selected from materials expected to be found in the sample.

In some embodiments, the tomographic reconstruction algorithm comprises Algebraic Reconstruction Technique (ART), Simultaneous ART, Simultaneous iterative reconstruction technique (SIRT), Ordered subset SIRT, Multiplicative algebraic reconstruction technique, Maximum likelihood expectation-maximization, Ordered subset expectation-maximization, Ordered subset convex algorithm, Iterative coordinate descent (ICD), Ordered subset ICD, or Model-based iterative reconstruction In some embodiments, determining an estimated atomic number and an estimated density for multiple volume elements in the sample using a tomographic algorithm includes correcting using a tomographic algorithm that corrects for beam hardening.

In some embodiments, directing x-rays toward a sample from multiple directions includes directing x-rays from a synchrotron.

In some embodiments, directing x-rays toward a sample from multiple directions includes directing x-rays generated by the impact of an electron beam with a target.

Some embodiments of the invention provide a method of determining a material characteristic of material in a sample by iterative tomographic reconstruction, comprising:

A. directing x-rays toward a sample from multiple directions;

B. measuring the x-ray intensity of x-rays that have traversed the sample;

C. determining one or more estimated material characteristics for multiple volume elements in the sample using a tomographic reconstruction algorithm; and D. modifying the one or more estimated material characteristics by reference to stored material characteristic data.

In some embodiments, the method further comprises labeling the reconstructed volume representing the sample into regions of materials having similar characteristics.

In some embodiments, which modifying the one or more estimated material characteristics by reference to material characteristics of known materials from a materials library includes determining the known materials is based on a probabilistic classification to determine the most more likely material in the sample for each volume element.

In some embodiments, modifying the one or more estimated material characteristics by reference to stored material characteristic data includes modifying the one or more estimated material characteristics by reference to mass attenuation tables.

In some embodiments, modifying the estimated material characteristics by reference to stored material characteristic data includes modifying the one or more estimated material characteristics by reference to a materials characteristics library.

Some embodiments of the invention provide a method of determining the atomic number and density of material in a sample by iterative tomographic reconstruction, comprising:

A. directing x-rays toward a sample from multiple directions;

B. measuring the x-ray intensity of x-rays that have traversed the sample;

C. determining one or more estimated material characteristics for multiple volume elements in the sample using a tomographic reconstruction algorithm; and D. modifying the one or more estimated material characteristics by reference to stored material characteristic data, wherein the reconstruction performs 3D tomographic reconstruction and 3D labeling of voxels based on material characteristics simultaneously in the same algorithm, the bias the reconstruction provides to the labeling is corrected during iterations.

Some embodiments of the invention provide a method of determining the atomic number and density of material in a sample by iterative tomographic reconstruction, comprising:

A. directing x-rays toward a sample from multiple directions;

B. measuring the x-ray intensity of x-rays that have traversed the sample;

C. determining during a first iteration using the measured x-ray intensities a characteristic of multiple voxels and matching the voxels to a known material using a data source of physical properties of the known materials; and D. verifying the matched material for the multiple voxels during a subsequent iteration and correcting false matchings to determine the composition of the sample volume during iterative reconstruction.

In some embodiments, determining the composition of the sample volume during reconstruction includes segmenting the sample into regions of common composition, the segmenting being performed during iterative reconstruction instead of being based on the voxel characteristics determined upon the completion of iterative reconstruction.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

Although the present invention and its advantages have been described in detail, it should be understood that various changes, substitutions and alterations can be made herein without departing from the spirit and scope of the invention as defined by the appended claims. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method of determining the atomic number and density of material in a sample by iterative tomographic reconstruction, comprising:

(a) directing x-rays toward a sample from multiple directions;

(b) measuring the x-ray intensity of x-rays that have traversed the sample;

(c) calculating an estimated atomic number and calculating an estimated density for multiple volume elements in the sample using a tomographic reconstruction algorithm;

(d) modifying the estimated atomic numbers and estimated densities by reference to atomic numbers and densities of known materials from a materials library; and (e) performing one or more additional iterations of the tomographic reconstruction algorithm where each iteration updates the modified atomic numbers and densities for the volume elements.

2. The method of claim 1 in which modifying the estimated atomic numbers and estimated atomic densities includes calculating update values for the estimated atomic numbers and estimated atomic densities.

3. The method of claim 2 in which at least one of the additional iterations further comprises modifying the updated estimated atomic numbers and estimated densities using atomic numbers and densities of known materials from the materials library.

4. The method of claim 1 in which modifying the estimated atomic numbers and estimated densities by reference to atomic numbers and densities of known materials from a materials library includes modifying based on a probabilistic classification to determine a most likely material in the materials library for each volume element.

5. The method of claim 4, in which modifying the estimated atomic numbers and estimated densities for at least one of the iterations includes modifying the numbers with a constrained update making the modified numbers to be consistent with known material properties in the materials library.

6. The method of claim 1 further comprising segmenting the iterative tomographic reconstruction of the sample into regions of materials having similar atomic numbers and densities.

7. The method of claim 6 in which the segmenting occurs at least once during the iterative tomographic reconstruction of the sample.

8. The method of claim 1 in which directing x-rays toward a sample from multiple directions includes two or more steps, each step comprising directing x-rays toward the sample with an energy or energy spectrum different from that used in at least one other step.

9. The method of claim 1 in which the x-rays directed towards the sample contain a spectrum of energies and measuring the x-ray intensity of x-rays that have traversed the sample further comprises measuring information about the energy spectrum of x-rays that have traversed the sample.

10. The method of claim 1 in which the materials library includes minerals.

11. The method of claim 10 in which the materials library is limited to materials expected to be found in the sample.

12. The method of claim 1 in which the tomographic reconstruction algorithm comprises Algebraic Reconstruction Technique (ART), Simultaneous ART, Simultaneous iterative reconstruction technique (SIRT), Ordered subset SIRT, Multiplicative algebraic reconstruction technique, Maximum likelihood expectation-maximization, Ordered subset expectation-maximization, Ordered subset convex algorithm, Iterative coordinate descent (ICD), Ordered subset ICD, or Model-based iterative reconstruction.

13. The method of claim 1 in which determining an estimated atomic number and an estimated density for multiple volume elements in the sample using a tomographic reconstruction algorithm includes correcting using a tomographic reconstruction algorithm that corrects or accounts for beam hardening.

14. The method of claim 1 in which directing x-rays toward a sample from multiple directions includes directing x-rays from a synchrotron.

15. The method of claim 1 in which directing x-rays toward a sample from multiple directions includes directing x-rays generated by the impact of an electron beam with a target.

16. The method of claim 1 in which modifying the estimated atomic numbers and estimated densities by reference to atomic numbers and densities of known materials from a materials library includes modifying the estimated atomic numbers and estimated densities by reference to mass attenuation tables.

17. A tomography system, comprising:
an X-ray beam source to be directed through a sample;
a rotating sample holder;
an X-ray detector for detecting energy from the X-ray beam source; and
a system controller operatively connected to the X-ray beam source, the rotating sample holder, and the X-ray detector, and including a program memory including computer instructions for performing the method of claim 1.

* * * * *